J. E. WOOTTEN.

STEAM BOILER FURNACE.

No. 7,267. Reissued Aug. 15, 1876.

*Witnesses.*
J. L. Skidmore
Ed. F. Nottingham

*Inventor.*
J. E. Wootten
by his Attorneys
Howson and Sons

N. PETERS, PHOTO-LITHOGRAPHER, WASHINGTON, D. C.

UNITED STATES PATENT OFFICE.

JOHN E. WOOTTEN, OF READING, PENNSYLVANIA.

IMPROVEMENT IN STEAM-BOILER FURNACES.

Specification forming part of Letters Patent No. 173,432, dated February 15, 1876; reissue No. 7,267, dated August 15, 1876; application filed April 29, 1876.

*To all whom it may concern:*

Be it known that I, JOHN E. WOOTTEN, of Reading, Pennsylvania, have invented certain Improvements in Burning Waste Anthracite Coal in Steam-Boiler Furnaces, of which the following is a specification:

The main object of my invention is to utilize, as an available fuel for generating steam in steam-boilers, the waste or refuse anthracite coal which remains after masses have been broken to the proper size for the market, and which has hitherto been regarded as useless. This object I attain in the manner which I will now proceed to describe, reference being had to the accompanying drawing, in which—

Figure 1:
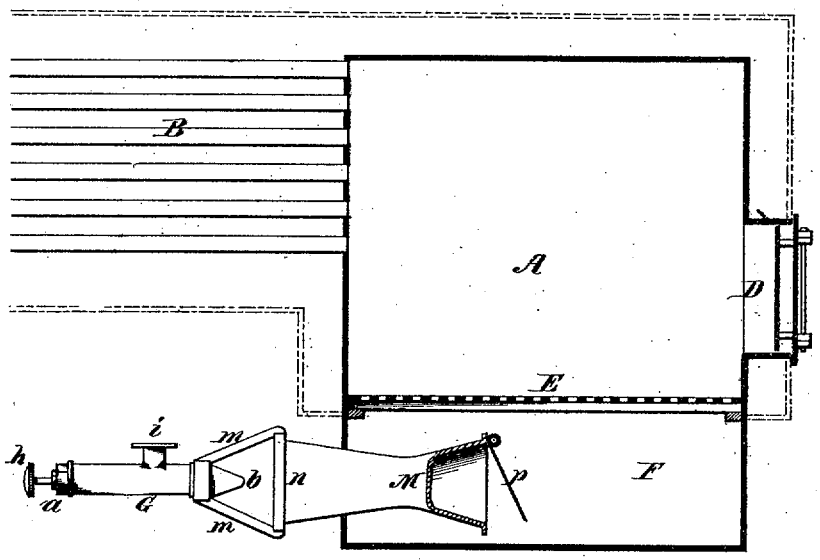
Figure 2:
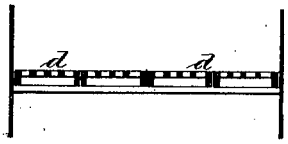

Figure 1 is a vertical section of the fire-box end of a boiler of a locomotive type, illustrating the mode of carrying my invention into effect; Fig. 2, a transverse section of part of the fire-box and perforated fuel-bed, and Fig. 3 a perspective view of the fuel-bed drawn to an enlarged scale.

A is the fire-box of the boiler; B, the usual system of tubes; D, the fuel-door, and E the fuel-bed, which is, in the present instance, composed of perforated and flanged plates or channel-bars *d* of wrought-iron, the flanges of one bar being secured to those of the adjoining bar, and the whole forming a continuous perforated bed, strengthened by the flanges, and resting on suitable ledges in the interior of the fire-box. Beneath the fuel-bed E, and to the lower edge of the fire-box, is secured an ash-pan, F, closed at the bottom and on all four sides, excepting where air is introduced under pressure, the doorway through which ashes are removed being closed while the furnace is in operation.

In using anthracite coal in lumps of the usual prepared sizes in the ordinary furnaces of steam-boilers, the practice is to burn the coal in a somewhat thick or deep mass, and to disturb the upper part of the mass as little as possible, for when that is done the active combustion of the fuel is seriously interfered with.

In carrying out my invention, however, a very different rule must be observed as regards the thickness of the mass of fuel and its treatment, for the waste anthracite must be burned in a comparatively thin layer, and as the upper surface of the layer becomes incrusted it must be scored from above at intervals by a suitable instrument introduced through the door of the furnace, the fuel being meanwhile subjected to a continuous blast from below. This process, instead of checking the active combustion of the fuel, greatly increases its intensity, for an increased volume of flame will emanate from the fuel as soon as it is scored from above.

The waste anthracite is, from time to time, fed to the furnace in small quantities, so as to maintain the comparatively thin layer on the fire-bed, and the above-described scoring operation is repeated at intervals. The result is an efficient utilization of the hitherto useless anthracite by a thorough and complete combustion.

I prefer the mode shown in the drawing of introducing air under pressure to the closed ash-pan, into which projects a pipe, M, the inner end of the latter being furnished with a valve, *p*, a steam-nozzle, G, communicating with the steam-space of the boiler, being presented to the outer open end of the said pipe. The jet of steam will not only induce the air to pass through the pipe M, but, by heating the air, will better adapt it to the duty which it has to perform.

It should be understood that, although I have shown, in connection with the ash-pan, but one air-pipe, M, and one steam-nozzle, the number of pipes and nozzles may be increased in accordance with the dimensions of the fire-box. There should be in connection with each nozzle, or with the steam-pipe communicating therewith, a suitable cock, by manipulating which the engineer may cut off the steam, and the valve *p* of each air-pipe may be so hung or so weighted that it will be self-closing when the operation of the steam-jet ceases, thereby excluding the air from the ash-pan. The importance of this self-closing valve, however, becomes most prominent where several air-pipes and steam-nozzles are used, for should the access of steam to one or more of the nozzles be cut off the valves of the air-pipes appertaining to these nozzles will be closed, thereby preventing the return of the air introduced through the medium of steam-jets by the other nozzles through their air-pipes into the ash-pan.

A fire-bed presenting a number of perforations may be constructed in different ways; but I prefer to make it of comparatively thin plate-iron, in sections or bars, flanged at the edges, these flanges being made either by bending the edges of the plates or during the rolling of the same, for the twofold purpose of preventing the fuel-bed from warping and of affording the means of securing the plates together.

Figure 3:
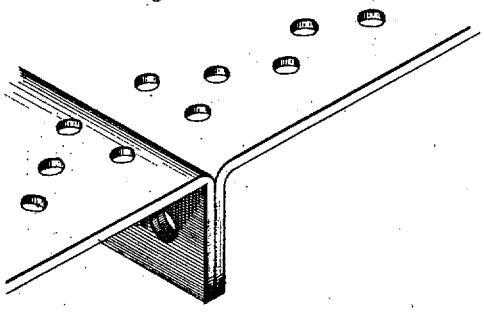

In practice I have used plate-iron of about a quarter of an inch thick, with perforations about three-eighths of an inch in diameter, arranged substantially as shown in Fig. 3, and I prefer this use of plate-iron, for it may be so thin that the perforations cannot be easily choked by the ashes.

I claim as my invention—

1. The mode herein described of burning waste anthracite coal in a steam-boiler furnace—that is to say, by depositing it in a thin layer on a grate, repeatedly raking or breaking up the ignited layer from above, and subjecting it from below to numerous jets of air under continuous pressure from a closed ash-pan, all as set forth.

2. The combination, in a steam-boiler furnace, of a perforated fuel-bed, E, the ash-pan F, pipe or pipes M, and steam nozzle or nozzles G, communicating with the steam-space of the boiler, all as set forth.

In testimony whereof I have signed my name to this specification in the presence of two subscribing witnesses.

JOHN E. WOOTTEN.

Witnesses:
HARRY HOWSON, Jr.,
HARRY SMITH.